United States Patent [19]

Bull et al.

[11] Patent Number: 5,750,450
[45] Date of Patent: May 12, 1998

[54] ABLATION RESISTANT ZIRCONIUM AND HAFNIUM CERAMICS

[75] Inventors: Jeffrey Bull, San Jose, Calif.; Michael J. White, Cumberland, R.I.; Larry Kaufman, Brookline, Mass.

[73] Assignee: The United States of America as represented by the Administrator of the National Aeronautics and Space Administration, Washington, D.C.

[21] Appl. No.: 723,484

[22] Filed: Sep. 30, 1996

Related U.S. Application Data

[60] Provisional application No. 60/009,744 Jan. 8, 1996.

[51] Int. Cl.⁶ .......................... C04B 35/577; C04B 35/58
[52] U.S. Cl. ................... 501/91; 501/92; 501/46.3
[58] Field of Search ..................... 501/91, 92, 96.3

[56] References Cited

U.S. PATENT DOCUMENTS

| | | | |
|---|---|---|---|
| 3,165,864 | 1/1965 | Shulze | 50/464 |
| 3,775,137 | 11/1973 | Clougherty et al. | 106/44 |
| 3,937,619 | 2/1976 | Clougherty | 29/182.5 |
| 4,636,481 | 1/1987 | Kida et al. | 501/96 |
| 4,735,923 | 4/1988 | Sugawara et al. | 501/92 |
| 4,915,736 | 4/1990 | Clarr et al. | 75/238 |
| 4,990,470 | 2/1991 | Yamamura et al. | 501/91 |
| 5,004,714 | 4/1991 | Clarr et al. | 501/134 |
| 5,024,977 | 6/1991 | Friederich et al. | 501/91 |
| 5,034,355 | 7/1991 | Tani et al. | 501/92 |
| 5,066,622 | 11/1991 | Clarr et al. | 501/87 |
| 5,149,678 | 9/1992 | Clarr et al. | 501/134 |
| 5,275,982 | 1/1994 | Clarr et al. | 501/87 |

OTHER PUBLICATIONS

J. Bull "The Influence of SiC on the Ablation Response of Advanced Refractory Composite Materials" 19th Conf. Comp. Mtls. & Structures Jan. '95.

L. Kaufman, "Boride Composites—A New Generation of Nose Cap and Leading Edge Materials for Reuseable Lifting Re-entry Systems".

AIAA Paper No. 70-278, AIAA Advanced Space Transportation Meeting, Feb., 1970.

*Primary Examiner*—Karl Group
*Attorney, Agent, or Firm*—Kenneth L. Warsh; Harry Lupuloff; John G. Mannix

[57] ABSTRACT

High temperature ablation resistant ceramic composites have been made. These ceramics are composites of zirconium diboride and zirconium carbide with silicon carbide, hafnium diboride and hafnium carbide with silicon carbide and ceramic composites which contain mixed diborides and/or carbides of zirconium and hafnium, along with silicon carbide.

17 Claims, 1 Drawing Sheet

ABLATION RESISTANT ZIRCONIUM AND HAFNIUM CERAMICS

ORIGIN OF THE INVENTION

The invention described herein was made in the performance of work under a NASA contract and is subject to Public Law 95-517 (35 U.S.C. 200 et seq.). The contractor has not elected to retain title in the invention.

REFERENCE TO COPENDING APPLICATION

This application claims the benefit of U.S. Provisional Application No. 60/009,744 filed on Jan. 8, 1996.

FIELD OF THE INVENTION

The invention relates to ablation resistant ceramics comprising (i) zirconium diboride and carbides of zirconium and silicon, (ii) hafnium diboride and carbides of hafnium and silicon and (iii) a diboride and a carbide of zirconium, hafnium or mixture thereof, along with silicon carbide. More particularly, the invention relates to high temperature ablation resistant ceramic compositions made by sintering a mixture of $MB_2$, M'C and SiC wherein M and M' are the same or different metal and are selected from the group consisting essentially of zirconium, hafnium and mixture thereof, wherein the metal components comprise a majority of the ceramic composition and wherein the SiC is present in an amount of less than 20%.

BACKGROUND OF THE DISCLOSURE

Reusable space vehicles, such as the space shuttle which must leave and reenter the earth's atmosphere, require exterior thermal protection. The successful operation of the space shuttle required the development of light weight and very thermally efficient exterior thermal protection systems which had to withstand a wide variety of environments. These thermal protection systems (TPS) are in the form of rigid surface insulation in areas of high temperature (1000°–1400° C.), blanket insulation in areas of moderate high temperature (below 1000° C.) and oxidation protected reinforced carbon/carbon in areas of severe temperatures (1400°–1600° C.). During reentry back into earth's atmosphere, the TPS must maintain the vehicle's exterior structure below 175° C. while experiencing substantial aeroconvective thermal environments which can heat the surface of the TPS to temperatures in excess of 1,500° C. In space the thermal protection must insulate the vehicle from the deep and constant cold (e.g., –70° C.) experienced while in orbit. In addition to thermal and aeroconvective environments, the TPS must also be able to withstand the mechanical stress associated with launch vibrations, acoustics, structural movement of the surface of the vehicle and of the TPS material, and the landing impact. Rigid carbon/carbon is used on the nose or tip and other leading edges on these vehicles. For example, a rigid carbon-carbon ceramic composite having an outer coating of silicon carbide to protect the carbon from oxidative degradation is used on the space shuttle orbiter. However, the high heat fluxes and temperatures associated with high performance hypervelocity flight requires the use of TPS materials having oxidation resistance, thermal shock resistance, configurational stability and ablation resistance superior to materials that have been used to date.

Both $ZrB_2$/SiC and $HfB_2$/SiC ceramic composites are known to have good oxidation and thermal shock resistance, good configurational stability and good ablation resistance. Ceramic composites of this type are disclosed in U.S. Pat. No. 3,775,137 and in a paper by L. Kaufman, "Boride Composites—A new Generation of Nose Cap and Leading Edge Materials for Reuseable Lifting Re-entry Systems", AIAA Paper No. 70-278, AIAA Advanced Space Transportation Meeting, February, 1970, the disclosures of which are incorporated herein by reference. The ablation resistance can be defined in terms of flight Mach number vs. stagnation heat flux. A measuring stick for the ablation resistance of a material is its conversion rate in the appropriate aerodynamic heating environment. The ablation resistance of $ZrB_2$/SiC and $HfB_2$/SiC ceramic composites is believed to arise from the formation of a coherent passivating oxide scale on the surface. The thermal shock resistance is a reflection of their good thermomechanical properties and the configurational stability from their relatively high hardness. However, it has been observed that these materials have a definite transition point in terms of the cohesiveness of the protective oxide scale. This transition occurs within the operational envelope (Mach number vs. stagnation heat flux) of the material which results in microspallation and concomitant accelerated conversion. The mechanisms responsible for the transition are not well understood, but seem to be dependent on the pressure, a function of altitude, and temperature, a complex function of the heat flux, gas enthalpy (flow velocity) and material properties. Illustrative examples of these factors and how they interrelate with, and effect the ablation and thermal shock resistance of, $ZrB_2$/SiC, $HfB_2$/SiC and other ceramic composites are also disclosed in the Kaufman paper referred to above. The transition also results in contamination of the space vehicle to which it is attached or its boundary layer. Accordingly, there is a need for a ceramic composition which can be used in a TPS on the leading edges and nose caps or tips of hypervelocity, reentry space vehicles with ablation resistance superior to that of rigid carbon/carbon, $ZrB_2$/SiC, $HfB_2$/SiC and other known ceramic composites.

SUMMARY OF THE INVENTION

The present invention relates to the discovery of zirconium and hafnium ceramic compositions having superior high temperature ablation resistance. The ceramic compositions of the invention comprise mixtures of zirconium diboride and carbide with silicon carbide, mixtures of hafnium diboride and carbide with silicon carbide and mixtures of zirconium and hafnium diborides and/or carbides with silicon carbide. The ceramic compositions of the invention are composites of more than one phase and represent an advancement over the $ZrB_2$/SiC and $HfB_2$/SiC ceramic compositions of the prior art in including zirconium and/or hafnium carbide as well as mixtures of zirconium and/or hafnium diborides and carbides in the composition. More specifically, the invention relates to an ablation resistant ceramic composite having a composition selected from the group consisting essentially of (i) zirconium diboride, zirconium carbide and silicon carbide, (ii) hafnium diboride, hafnium carbide and silicon carbide and (iii) silicon carbide, at least one of zirconium diboride, hafnium carbide and mixture thereof, and at least one of zirconium carbide, hafnium carbide and mixture thereof. More particularly, the invention relates to high temperature ablation resistant ceramic composites made by sintering a mixture of $MB_2$, M'C and SiC wherein M and M' are the same or different metal and are selected from the group consisting essentially of zirconium, hafnium and mixture thereof, wherein the metal containing components comprise a majority of the ceramic composition and wherein the SiC is present in a minor amount. By metal containing components is meant $ZrB_2$, $ZrC$, $HfB_2$ and $HfC$. The ceramic composites of the invention are either carbide rich or diboride rich, at the discretion of the practitioner. The Zr and Hf metal diboride components of the ceramic are present in an amount ranging from 20–64% of the total composition. Similarly, the Zr and Hf metal carbide components are present in an amount of from 20–64%. The SiC is present in the ceramic in an amount of less than 20% and preferably from 10–16%. Unless otherwise indicated, all percentages herein refer to volume percent based on the volume percent of each ceramic powder used in making a ceramic composition of the invention, based on the total volume of starting powder. In making a ceramic composition of the invention, $MB_2$, M'C and SiC powders are mixed and hot pressed at a temperature and for a time sufficient to form the ceramic. In general, the sintering temperature is at least about 1900° C.

DETAILED DESCRIPTION

Figure 1:
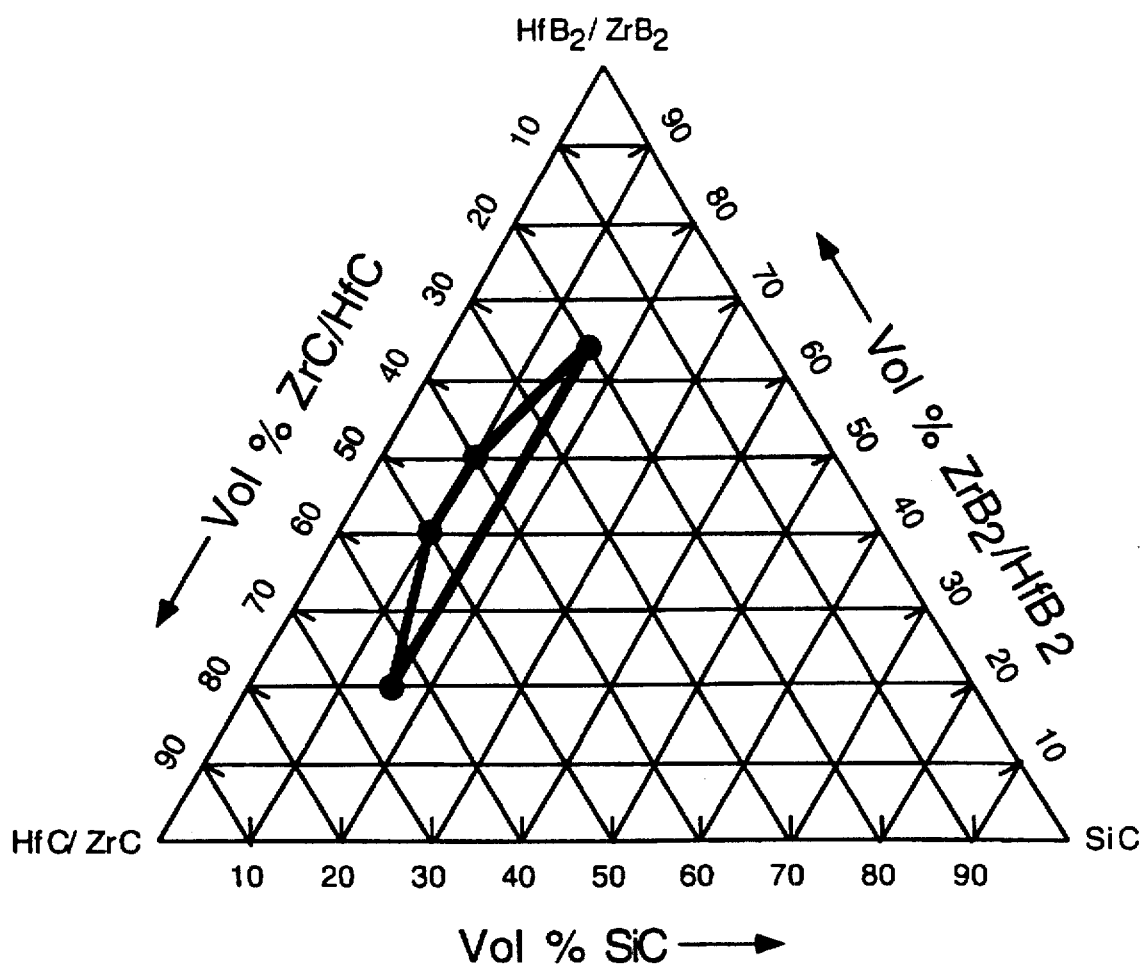
FIG. 1 is a pseudo ternary phase diagram of ceramic composites of the invention which contain minor amounts of SiC along with either zirconium diboride and carbide or hafnium diboride and carbide.

The ceramic compositions of the invention comprise (i) zirconium diboride, zirconium carbide and silicon carbide, (ii) hafnium diboride, hafnium carbide and silicon carbide and (iii) silicon carbide, at least one of zirconium diboride, hafnium diboride and mixture thereof, and at least one of zirconium carbide, hafnium carbide and mixture thereof. They are made by sintering a mixture of $MB_2$, M'C and SiC wherein M and M' are the same or different metal and are selected from the group consisting essentially of zirconium, hafnium and mixture thereof. These compositions can be expressed as, for example, $ZrB_2$/$ZrC$/SiC for a diboride rich composition of the invention made by sintering a mixture of $ZrB_2$, $ZrC$ and SiC which forms a ceramic composition containing these three components and as $ZrC$/$ZrB_2$/SiC for a carbide rich composition formed by sintering a mixture of the same components in which $ZrC$ is present in an amount greater than the $ZrB_2$. For a diboride rich composition formed by sintering a mixture of $ZrB_2$, $HfB_2$, $ZrC$ and SiC it is expressed as $(ZrB_2+HfB_2)$/$ZrC$/SiC and for a carbide rich ceramic formed by sintering the same components in which the metal carbide, $ZrC$, is present in an amount greater than the $ZrB_2+HfB_2$ it is expressed as $ZrC$/$(ZrB_2+HfB_2)$/SiC Thus, the boride rich ceramic compositions of the invention include the following:

| Diboride Rich Ceramics | |
| --- | --- |
| $ZrB_2$/$ZrC$/SiC | $(ZrB_2 + HfB_2)$/$ZrC$/SiC |
| $ZrB_2$/$HfC$/SiC | $(ZrB_2 + HfB_2)$/$HfC$/SiC |
| $HfB_2$/$HfC$/SiC | $ZrB_2$/$(ZrC + HfC)$/SiC |
| $HfB_2$/$ZrC$/SiC | $HfB_2$/$(HfC + ZrC)$/SiC$(ZrB_2 + HfB_2)$/$(ZrC + HfC)$/SiC. |

As set forth above, these nine different compositions are shown as being diboride rich, in that there is more metal diboride (e.g., $ZrB_2$) than metal carbide (e.g., $ZrC$) present in the ceramic. Therefore, the diboride is presented as the first component. The convention for carbide rich compositions in which there is more metal carbide than metal diboride present is, for example, $ZrC$/$ZrB_2$/SiC. The amount of SiC is not considered when expressing a ceramic of the invention diboride rich or carbide rich, since silicon is not a metal in the true sense of the word and is present in an amount less than that of the metal components. As disclosed above, the $ZrB_2$, $ZrC$, $HfB_2$ and $HfC$ metal components comprise a majority of the ceramic composition and the SiC is present in a minor amount of less than 20% and preferably not more than 16%. The $ZrC$/$ZrB_2$/SiC and $HfC$/$HfB_2$/SiC represent ceramics of groups (i) and (ii) respectively, while the other seven diboride rich ceramic compositions fall into group (iii) set forth above. The ceramic composites of the invention are either diboride rich or carbide rich, at the discretion of the practitioner. However, the diboride rich composite ceramics of the invention have properties superior to those of the carbide rich composites and are therefore preferred for use where superior ablation resistance is required. Further, the hafnium containing composites have properties superior to those of composites which contain only zirconium, with diboride rich ceramics sintered from $HfB_2$, $HfC$ and SiC ($HfB_2$/$HfC$/SiC) being most superior. The carbide rich compositions of the invention are analogous to the diboride rich compositions listed above in being formed by sintering mixtures of the same starting components, but in different amounts, and are set forth below.

| Carbide Rich Ceramics | |
| --- | --- |
| $ZrC$/$ZrB_2$/SiC | $ZrC$/$(ZrB_2 + HfB_2)$/SiC |
| $HfC$/$ZrB_2$/SiC | $HfC$/$(ZrB_2 + HfB_2)$/SiC |
| $HfC$/$HfB_2$/SiC | $(ZrC + HfC)$/$ZrB_2$/SiC |
| $ZrC$/$HfB_2$/SiC | $(HfC + ZrC)$/$HfB_2$/SiC$(ZrC + HfC)$/$(ZrB_2 + HfB_2)$/SiC. |

As is the case for the diboride rich ceramics of the invention, the $ZrC$/$ZrB_2$/SiC and $HfC$/$HfB_2$/SiC ceramics of the invention are representative of groups (i) and (ii), respectively, while the seven other carbide rich ceramic compositions of the invention fall into group (iii). The $ZrB_2$ and $HfB_2$ metal diboride components used in forming ceramic compositions of the invention are present in an amount ranging from 20–64% of the total composition. Similarly, the $ZrC$ and $HfC$ metal carbide components present in the mixture of powders used to form a ceramic of the invention will range from 20–64%. The SiC powder is present in the mixtures in an amount of less than 20% and preferably from 10–16%. Thus, in expressing the ceramic compositions of the invention as $MB_2$/M'C/SiC, the $MB_2$ is present in an amount of from 20–64%, the M'C is also present in an amount of from 20–64%, and the SiC is present in an amount of from 10–16%. As disclosed above, M and M' are the same or different and are each selected from the group consisting of Zr, Hf and mixture thereof so that the ceramic composition is one of the eighteen different compositions listed above. As set forth above, for the sake of convenience the expression $MB_2$/M'C/SiC is used to describe both the diboride rich ceramics of the invention and their carbide rich analogs, the difference being determined by the amounts of metal diboride and metal carbide present in the ceramic. Further, the ceramic compositions of the invention are operative with stoichiometric (whole-number atomic) proportions and slight departures from stoichiometric (other than whole-number atomic) proportions. Therefore, the use of the terms $MB_2$, M'C, SiC, $ZrB_2$, $ZrC$, $HfB_2$ and $HfC$ is intended to include both stoichiometric and slightly non-stoichiometric proportions. By slight departure from stoichiometry is meant within ±10 atomic % and preferably ±5 atomic %. By way of an illustrative, but nonlimiting example, this means that for i.e., $ZrC$, the stoichiometry can range from $Zr_{0.9}C_{1.1}$ to $Zr_{1.1}C_{0.9}$ and preferably within $Zr_{0.95}C_{1.05}$ to $Zr_{1.05}C_{0.95}$ and so on for the other components of the ceramics.

FIG. 1 is a pseudo-ternary phase diagram of ceramic compositions of the invention. This phase diagram is for the case where the ceramic composites contain either zirconium diboride and carbide in combination with silicon carbide, or hafnium diboride and carbide in combination with silicon carbide, but not composites containing a mixture of both zirconium and hafnium diborides and/or carbides in combination with silicon carbide. By pseudo-ternary is meant that the three points of the triangle are the starting zirconium or hafnium diboride, zirconuim or hafnium carbide and silicon carbide components, as opposed to a true ternary diagram in which the individual elements themselves are represented. The compositions of the invention are defined by the trapezoidal shaped quadrilateral inside the triangular phase diagram in which the end points are defined by the SiC ranging between 10–16%, the ZrC or HfC ranging between 20–64% and the $ZrB_2$ or $HfB_2$ ranging between 20–64%. These compositions and many other ceramic compositions of the invention have been made and are disclosed in the Examples below.

Photomicrographs of a cross-section at the outer surface region of a ceramic of the invention and the prior art (not shown) were taken to compare the depletion zone and oxide scale of each ceramic after exposure to a high temperature aeroconventive environment. A photomicrograph such as this illustrates a diboride rich $HfB_2$/20HfC/16SiC ceramic of the invention prepared by sintering a mixture of $HfB_2$, HfC and SiC in volume amounts of 64, 20 and 16%, respectively. Another such photomicrograph illustrates a diboride rich $HfB_2$/SiC ceramic of the prior art prepared by sintering 80% $HfB_2$ and 20% SiC powders. These photomicrographs were taken after both ceramics had been exposed to 400 W/cm² at a pressure of 0.075 atmospheres for 3 minutes according to the procedure set forth in the Examples 9–16 and Comparative Examples C and D below. Both photomicrographs show a large light appearing area which is the original ceramic. The band adjacent to the light area is the depletion zone in which SiC has been removed due to the high temperature, oxidative, environment leaving pores. The next and outer band is the oxide layer. The depletion zone and oxide scale thicknesses for the ceramic of the invention in the photograph are 140 and 300 microns thick, respectively. For the $HfB_2$/SiC ceramic of the prior art of the second photograph they are 340 and 100 microns thick. The presence of the relatively thick oxide zone on the ceramic of the invention has acted as a thermal insulation layer which has protected the underlying ceramic from the greater damage done to the prior art ceramic. This is supported by the relatively thin depletion zone and the relative sharpness of the edge of the ceramic of the invention, which is an indication of dimensional stability compared to the prior art ceramic. In contrast, the prior art ceramic has a thinner oxide layer, a substantially thicker depletion zone into the ceramic and the edge of the ceramic is much rounder or less sharp due to the aeroconvective degradation.

The diboride and carbide powders used in preparing a ceramic composition of the invention are commercially available, standard grade powders. The powder size is typically ~150 mesh or finer and typical purity is 99% and preferably 99.5% or better based on a spectrographic analysis of trace metallic content. A typical particle size distribution yields 99% of the powder as having a particle size less than 56 microns. The oxygen content should be no greater than, and preferably less than, 1.5 wt. %. Those skilled in the art know that finer particle sizes produce ceramic composites with finer grain sizes and consequently better ablation resistance, higher strength and related mechanical properties. Very fine particle sizes (e.g., ~325 mesh) can result in too much oxygen pickup. This is avoided by starting with the coarser particle sizes and ball milling to arrive at the final particle size used in the sintering step, which typically is 10 microns or less. Prior to the sintering step to form a ceramic of the invention, the metal diboride powder(s), the metal carbide powder(s) and the silicon carbide powder are intimately mixed by suitable means such as a ball mill, either wet or dry, but preferably wet, using suitable milling media which is heavy enough to break up powder agglomerates and which will not contaminate the powder and concomitantly the sintered ceramic. Using a liquid which will not contaminate either the powders or the resultant ceramic, such as an alcohol (e.g., ethanol) or distilled and deionized water, in the mixing/milling process aids in breaking up particle agglomerations to form a more intimate mixture than is obtained without the presence of the liquid. Illustrative, but nonlimiting examples of preferred milling media used in the milling step includes balls made of silicon carbide, hafnium carbide or diboride and tungsten carbide. The powders are mixed and pulverized over a period of from one to three or more days to form the desired intimate mixture, which is obtained when the average particle size of the mixed powders is less than 10 microns, typically on the order of about 0.1–1.0 microns and preferably less than 0.5 microns. The mixture of powders is then dried to remove any liquid, filled into a graphite mold and heated under pressure in an inert atmosphere for a period of time sufficient to reach a density of the so-formed ceramic of at least 96%, preferably at least 98% and still more preferably at least 99% of the calculated density. Generally a temperature of 1850° C. or more is required for a period of time of at least about 5 minutes and more generally 120 minutes to form the ceramic. The temperature of the sintering step will generally range from 1850° C. to 2250° C., with temperatures in the lower part of the range being preferred. The pressure during sintering is applied by means of a graphite die at a pressure of 1 ksi or higher. A pressure of 3 ksi has been found to be useful when sintering ceramics of the invention. The time in the mold at temperature and pressure is composition and article size dependent and can range from 5 minutes to 2 hours as set forth above. The pressing time is dictated by that sufficient to fully consolidate the load as indicated by a ram displacement indicator. This procedure results in billet or plate stock with densities ranging from 95% to 100% of the calculated density, with higher densities being preferred. A density of 98% is considered typical. Calculated densities rather than theoretical densities are used, because the ceramic compositions of the invention are particulate composites and calculated density is synonymous with a fully dense mixture. Those skilled in the art know that calculated density is based on an algebraic rule-of-mixtures calculation using the measured (X-ray) densities of the component compounds ($ZrB_2$, ZrC, etc.). The theoretical density is generally in close agreement with the X-ray value and is calculated from structural information; atomic radii, unit cell packing, etc. The calculated densities assume no chemical interaction (solubility, miscibility, etc.) in the material and experimental data has supported this assumption.

The response and behavior of refractory materials to high temperature oxidizing conditions imposed by furnace heating differs markedly from the response and behavior in an arc plasma designed to simulate the aeroconvective conditions experienced by a reentry space vehicle. Those skilled in the art know that aeroconvective conditions include extremely rapid heating under high velocity gas-flow conditions, in which the energy flux rather than the temperature is defined and in which significant shear forces can be encountered. This is explained, for example, in the L. Kaufman article referred to earlier, the disclosure of which is incorporated herein by reference. Consequently, ceramic compositions of the invention and of the prior art were tested in NASA ARC's Arc-Jet Facilities which employ a plasma jet to provide the gas flow and heat. The test conditions were set to approximately (300 W/cm$^2$) and (400 W/cm$^2$) to induce the transition in oxidation of SiC from the passive to the activ mode, respectively. Tables 2 and 3 under the Examples below compare ceramics of the invention and of the prior art according to their conversion resistance at passive (Table 2) and active (Table 3) conditions.

The invention will be more readily understood with reference to the examples below.

EXAMPLES

In the examples below, all of the starting materials for the ceramics were powders having a nominal particle size such that all of the powders passed through a 325 mesh screen and a purity of at least 99%. The ZrB$_2$ powder was obtained from Advanced Refractory Technologies in Buffalo, N.Y. and the ZrC powder was obtained from Cerac, Inc. in Milwaukee, Wis. The SiC was obtained from Lonza, Inc. in Fairlawn, N.J. and the HfB$_2$ from H. C. Starke in Newton, Mass. In making a ceramic, the appropriate powders were weighed out and then intimately mixed in a ball mill using alumina balls as the mixing media for Examples 1,2 A and B and tungsten carbide balls for Examples 3–10, along with distilled and deionized water. The final particle size of the powders in the milled mixture was less than 1 micron. After drying, each batch was uniaxially hot pressed in a graphite die using a graphite ram at a temperature of at least about 1850° C., in an inert argon atmosphere at a ram pressure of 3500 psi. to form ceramic disks 3 inches in diameter and 0.30 inches thick. The specific gravity of each ceramic was measured by weighing dry and immersed in water. The hardness of the ceramics was measured with the Knoop microhardness using a Knoop indentor at a load of 500 g. The density and hardness values are mean values obtained from the measurement of a number of samples. The Knoop hardness values exclude anomalous results obtained when the indentor was observed to have cracked the surface near or on areas of porosity.

The ablation resistance was measured with arc-jet tests using a splash configuration model in which sample coupons nominally 0.75 inches in diameter and 0.25 inches thick were flush mounted in a graphite cylinder 1.25 inches in diameter with a 0.2 inch corner radius. The samples were shimed in place with Grafoil which insulated the sample from the holder. Fiberform insulation was used to insulate the backface of the sample from the holder. Arc-Jet testing was performed in NASA ARC's Aero Heating Facilities using a 12 inch diameter nozzle with a 1.5 inch diameter throat. Testing conditions were set using an actively cooled copper model with geometry identical to that of the sample model (flat face) fitted with a calorimeter to measure the cold wall heat flux. A 4 inch diameter copper hemispherical model was used to measure stagnation pressure which is known not to vary with the radius of a body in high speed flows. Conditions were set to provide passive oxidation of SiC and active oxidation of SiC. Each sample was inserted in the stream and held there for 5 minutes at the 300 W/cm$^2$ conditions and for 3 minutes at the 400 W/cm$^2$ conditions while recording temperatures and reradiated heat flux with remote sensors. An optical pyrometer recorded the outer surface temperature, while a sapphire optical fiber inserted through the back of the ceramic sample was used to measure the in-depth temperature of the ceramic. Post test physical measurements were made to determine the effective conversion rate.

In the examples below, the Effective Conversion Rate was determined by dividing the weight change of the ceramic by the initial weight, multiplying this number by the initial thickness and the difference between the thicknesses and dividing by the exposure time. The conversion depth is the difference between the initial thickness and the sum of the difference between the thickness measured at the oxide/nonoxide interface and the thickness of the depletion zone. In this way the depth measurement is unaffected by irregularities in the thickness of the oxide scale. The conversion rate was determined by dividing the conversion depth by the exposure time.

Example 1

In this example 64% ZrB$_2$, 20% ZrC and 16% SiC powders were weighed out, milled together, dried, placed into a die and hot pressed at 1985° C. until theoretical density was reached. A number of such diboride rich ZrB$_2$/ZrC/SiC ceramic samples of the invention were hot pressed from the same batch of milled powders. The specific gravity and hardness results are shown in Table 1 below. The ablation or conversion resistance of this ceramic under known passive and active conditions for the ZrB$_2$/SiC ceramic is shown in Tables 2 and 3, respectively.

Example 2

This example was similar to that of Example 1, except that the primary constituent was ZrC instead of ZrB$_2$ and the ceramic of the invention was a carbide rich ZrC/ZrB$_2$/SiC. Thus 64% ZrC, 20% ZrB$_2$ and 16% SiC were used. The hot pressing temperature was 1960° C. The specific gravity and hardness results are shown in Table 1 below. The ablation or conversion resistance of this ceramic under known passive and active conditions for ZrB$_2$/SiC is shown in Tables 2 and 3, respectively.

Comparative Example A

In this example, a prior art ZrB$_2$/SiC ceramic was made for comparison purposes by using 80% of the ZrB$_2$ powder and 20% of the SiC powder. The hot pressing temperature was 2030° C. The specific gravity and hardness results are shown in Table 1 below. The ablation or conversion resistance of this prior art ceramic under known passive and active conditions for it is shown in Tables 2 and 3, respectively.

Comparative Example B

In this example a prior art HfB$_2$/SiC ceramic was made for comparison purposes by using 80% of the HfB$_2$ powder and 20% of the SiC powder. The hot pressing temperature was 1915° C. The specific gravity and hardness results are shown in Table 1 below. The ablation or conversion resistance of this prior art ceramic under known passive and active conditions for it is shown in Tables 2 and 3, respectively.

TABLE 1

| Composition | Bulk density g/cm³ | Percent of Theoretical Density | Hardness kg/mm² |
|---|---|---|---|
| $ZrB_2$/20 ZrC/16 SiC | 5.63 | 98.3 | 2476 |
| ZrC/20 $ZrB_2$/16 SiC | 5.81 | 98 | 1829 |
| $ZrB_2$/20 SiC | 5.5 | 99.6 | 1522 |
| $HfB_2$/20 SiC | 9.52 | 100 | 2075 |

TABLE 2

Passive Condition (300 W/cm², 0.042 atm.)

| Composition | Effective Conversion Rate micron/min. | Peak Surface Temperature °C. |
|---|---|---|
| $ZrB_2$/20 ZrC/16 SiC | −4.30 | 1620 |
| ZrC/20 $ZrB_2$/16 SiC | −3.24 | 1620 |
| $ZrB_2$/20 SiC | −1.24 | 1630 |
| $HfB_2$/20 SiC | 0.45 | 1650 |

TABLE 3

Active Condition (400 W/cm², 0.058 atm.)

| Composition | Effective Conversion Rate micron/min. | Peak Surface Temperature °C. |
|---|---|---|
| $ZrB_2$/20 ZrC/16 SiC | −0.98 | 2020 |
| ZrC/20 $ZrB_2$/16 SiC | −6.83 | 2100 |
| $ZrB_2$/20 SiC | −17.78 | 2200 |
| $HfB_2$/20 SiC | 3.47 | 1810 |

Tables 4 and 5 give additional test data obtained for the above samples at both the passive and active aeroconventive test condidtions.

TABLE 4

Passive Condition (300 W/cm², 0.042 atm.)

| Composition | Oxide Scale Depth, μm | Depletion Zone Depth, μm | Conversion Depth, mm | Conversion Rate, mm/min. |
|---|---|---|---|---|
| $ZrB_2$/20 ZrC/16 SiC | 150 | 10 | 0.14 | 0.028 |
| ZrC/20 $ZrB_2$/16 SiC | 140 | 20 | 0.12 | 0.024 |
| $ZrB_2$/20 SiC | 110 | 40 | 0.09 | 0.018 |
| $HfB_2$ 20/SiC | 50 | 40 | 0.032 | 0.006 |

TABLE 5

Active Condition (400 W/cm², 0.042 atm.)

| Composition | Oxide Scale Depth, μm | Depletion Zone Depth, μm | Conversion Depth, mm | Conversion Rate, mm/min. |
|---|---|---|---|---|
| $ZrB_2$/20 ZrC/16 SiC | 310 | 0 | 0.25 | 0.083 |
| ZrC/20 $ZrB_2$/16 SiC | 280 | 20 | 0.27 | 0.09 |
| $ZrB_2$/20 SiC | 270 | 70 | 0.32 | 0.107 |
| $HfB_2$/20 SiC | 80 | 130 | 0.23 | 0.077 |

It can be seen from Table 2 that at nominal passive conditions no advantage is gained from the use of the two ceramic compositions of the invention over those of the prior art. However, Table 3 shows that at the more severe heating conditions of 400 W/cm² the two ceramic compositions of the invention are superior to the prior art $ZrB_2$/SiC ceramic and, in one case, even superior to the $HfB_2$/SiC prior art ceramic in terms of effective conversion rate. With respect to the effective conversion rates, negative numbers represent a growth or effusion of the oxide scale on the surface of the ceramic, while positive numbers represent actual removal and conversion of the surface. This is even more impressive when densities and surface temperatures are taken into account. About 50 seconds into the active condition, the $ZrB_2$/SiC ceramic experiences a transition or surface phenomenon in which surface temperatures rapidly climb to as high as 2200° C. which results in micro and macro spallation. Stability is not reestablished. Instead, a periodic fluctuation of temperature and spallation continue as active test conditions are maintained. With the pseudo-ternary compositions (i.e., $ZrB_2$/ZrC/SiC) none of this is observed and the effective conversion rate is 18 times better than that of the $ZrB_2$/SiC ceramic alone and 3.5 times better than $HfB_2$/SiC ceramic. The densities of the two pseudo-ternary compositions of the invention are nearly the same as that of the prior art $ZrB_2$/SiC, which means that no substantial weight penalty will be incurred by using the two pseudo-ternary compositions of the invention. Thus, these two compositions of the invention exhibit much superior spallation resistance at almost the same density as the prior art composition.

Examples 3–8

These examples are similar to Examples 1 and 2 in making ceramic composites of the invention. The composites, the percent of each powder used in the preparation of each ceramic and their densities are shown in Table 6.

TABLE 6

| Composite | Compounds, % | | | | | Density g/cm³ |
|---|---|---|---|---|---|---|
| | $ZrB_2$ | $HfB_2$ | ZrC | HfC | SiC | |
| $ZrB_2$/20 ZrC/16 SiC | 64 | | 20 | | 16 | 5.74 |
| $HfB_2$/20 HfC/16 SiC | | 64 | | 20 | 16 | 10.22 |
| ZrC/20 $ZrB_2$/16 SiC | 20 | | 64 | | 16 | 5.95 |
| HfC/20 $HfB_2$/16 SiC | | 20 | | 64 | 16 | 10.88 |
| ZrC/40 $ZrB_2$/10 SiC | 40 | | 50 | | 10 | 6.06 |
| $ZrB_2$/40 ZrC/10 SiC | 50 | | 40 | | 10 | 6.01 |
| $ZrB_2$/20 HfC/16 SiC | 64 | 20 | | | 16 | 6.97 |
| ZrC/20 $HfB_2$/16 SiC | | 20 | 64 | | 16 | 6.97 |

It is understood that the numbers used in the ceramic compositions refers to the volume percent of starting powders used to make the ceramic. Thus, by way of example, ZrC/20HfB₂/16SiC refers to a carbide rich ceramic made by sintering a milled mixture of 64% ZrC, 20% $HfB_2$ and 16% SiC.

Examples 9–16

These experiments were similar to those of example 2 above in testing ceramic compositions of the invention under active aeroconvective conditions, but included all of the compositions in Table 6 at slightly different aeroconvective parameters. The results are contained in Tables 7 and 8 below.

Comparative Examples C and D

These experiments were similar to Comparative Examples A and B, but at the different conditions, for comparative purposes. The results are also contained in Tables 7 and 8.

TABLE 7

Active Condition (400 W/cm², 0.075 atm.)

| Composition | Effective Conversion Rate micron/min. | Peak Surface Temperature °C. |
|---|---|---|
| $ZrB_2/20$ $ZrC/16$ SiC | 84.34 | 2240 |
| $ZrC/20$ $ZrB_2/16$ SiC | 1.97 | 2180 |
| $HfB_2/20$ $HfC/16$ SiC | 50.39 | 2090 |
| $HfC/20$ $HfB_2/16$ SiC | 27.29 | 2110 |
| $ZrB_2/20$ $HfC/16$ SiC | 132.96 | 2140 |
| $ZrC/20$ $HfB_2/16$ SiC | 5.7 | 2120 |
| $ZrB_2/50$ $ZrC/10$ SiC | −3.29 | 2200 |
| $ZrC/50$ $ZrB_2/10$ SiC | 11.02 | 2200 |
| $ZrB_2/20$ SiC | 144.04 | 2050 |
| $HfB_2/20$ SiC | 14.89 | 2050 |

TABLE 8

Active Condition (400 W/cm², 0.075 atm.)

| Composition | Oxide Scale Depth, μ | Depletion Zone Depth, μ | Conversion Depth, mm | Conversion Rate, mm/min. |
|---|---|---|---|---|
| $ZrB_2/20$ $ZrC/16$ SiC | 1000 | 200 | 0.81 | 0.27 |
| $ZrC/20$ $ZrB_2/16$ SiC | 480 | 40 | 0.49 | 0.16 |
| $HfB_2/20$ $HfC/16$ SiC | 300 | 140 | 0.21 | 0.07 |
| $HfC/20$ $HfB_2/16$ SiC | 380 | 200 | 0.58 | 0.19 |
| $ZrB_2/20$ $HfC/16$ SiC | N/A | 400 | 0.7 | 0.23 |
| $ZrC/20$ $HfB_2/16$ SiC | 260 | 300 | 0.83 | 0.28 |
| $ZrB_2/50$ $ZrC/10$ SiC | 560 | 80 | 0.46 | 0.15 |
| $ZrC/50$ $ZrB_2/10$ SiC | 520 | 60 | 0.36 | 0.12 |
| $ZrB_2/20$ SiC | N/A | 40 | 0.49 | 0.16 |
| $HfB_2/20$ SiC | 100 | 340 | 0.56 | 0.19 |

While individual results in Tables 7 and 8 may appear different from those obtained 2–5, the overall trends are the same. Differences in the examples are due to differences in active conditions and differences in the particular unit in which the tests were run, which is why the overall runs are repeated to always have controls present as comparisons.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A ceramic composite having a composition selected from the group consisting of (i) zirconium diboride, zirconium carbide and silicon carbide, (ii) hafnium diboride, hafnium carbide and silicon carbide and (iii) silicon carbide, at least one of zirconium diboride, hafnium diboride and mixture thereof, and at least one of zirconium carbide, hafnium carbide and mixture thereof, and wherein said silicon carbide is present in said composite in an amount of less than 20 volume %.

2. A ceramic composite according to claim 1 wherein said zirconium diboride and/or hafnium diboride is present in an amount of from 20–64 volume %.

3. A ceramic composite according to claim 2 wherein said carbide of zirconium, hafnium and mixture thereof is present in an amount of from 20–64 volume %.

4. A ceramic composite according to claim 3 wherein said silicon carbide is present in an amount of no more than 16% volume.

5. A ceramic composite according to claim 4 wherein said silicon carbide is present in an amount of from 10–16 volume %.

6. A ceramic composite made by sintering, under pressure, a mixture of $MB_2$, M'C and SiC wherein M and M' are the same or different metal and are selected from the group consisting of zirconium, hafnium and mixture thereof, wherein said $MB_2$ and M'C comprise a majority of said composite and wherein said SiC in said mixture is less than 20 volume %.

7. A ceramic composite according to claim 6 wherein said $MB_2$ is present in said mixture in an amount of from 20–64 volume %.

8. A ceramic composite according to claim 7 wherein said M'C is present in said mixture in an amount of from 20–64 volume %.

9. A ceramic composite according to claim 8 wherein said silicon carbide is present in said mixture in an amount of no more than 16 volume % and said sintering pressure is at least about 1 ksi.

10. A ceramic composite according to claim 9 wherein said silicon carbide is present in said mixture in an amount of from 10–16 volume %.

11. A ceramic composite according to claim 10 wherein said mixture is sintered at a temperature of at least about 1900° C.

12. A ceramic composite according to claim 10 containing zirconium diboride, zirconium carbide, and at least one component selected from the group consisting of hafnium diboride, hafnium carbide and mixture thereof.

13. A ceramic composite according to claim 10 containing hafnium diboride, hafnium carbide, and at least one component selected from the group consisting of zirconium diboride, zirconium carbide and mixture thereof.

14. A ceramic composite according to claim 10 wherein said mixture is sintered at a temperature and pressure of at least about 1900° C. and 3 ksi, respectively.

15. A diboride or carbide rich ceramic composite having a composition selected from the group consisting of $ZrB_2$/ZrC/SiC, $ZrB_2$/HfC/SiC, $HfB_2$/HfC/SiC, $HfB_2$/ZrC/SiC, ($ZrB_2$+$HfB_2$)/ZrC/SiC, ($ZrB_2$+$HfB_2$)/HfC/SiC, $ZrB_2$/(ZrC+HfC)/SiC, $HfB_2$/(HfC+ZrC)/SiC, ($ZrB_2$+$HfB_2$)/(ZrC+HfC)/SiC, ZrC/$ZrB_2$/SiC, HfC/$ZrB_2$/SiC, HfC/$HfB_2$/SiC, ZrC/$HfB_2$/SiC, ZrC/($ZrB_2$+$HfB_2$)/SiC, HfC/($ZrB_2$+$HfB_2$)/SiC, (ZrC+HfC)/$ZrB_2$/SiC, (HfC+ZrC)/$HfB_2$/SiC, (ZrC+HfC)/($ZrB_2$+$HfB_2$)/SiC and mixture thereof, wherein said SiC is present in an amount of less than 20 volume % and wherein said diborides and carbides are within ±10 atomic % of stoichiometry.

16. A composite according to claim 15 wherein said SiC is present in an amount of from 10–16 volume %.

17. A composite according to claim 16 wherein said diborides and carbides are within ±5 atomic % of stoichiometry.

* * * * *